United States Patent
Kaufman et al.

(10) Patent No.: US 7,372,558 B2
(45) Date of Patent: May 13, 2008

(54) METHOD AND SYSTEM FOR VISUALIZING SURFACE ERRORS

(75) Inventors: Steven P. Kaufman, Hooksett, NH (US); Arkady Savikovsky, Needham, MA (US)

(73) Assignee: Laser Projection Technologies, Inc., Londonderry, NH (US)

( * ) Notice: Subject to any disclaimer, the term of this patent is extended or adjusted under 35 U.S.C. 154(b) by 646 days.

(21) Appl. No.: 10/492,264

(22) PCT Filed: Oct. 11, 2002

(86) PCT No.: PCT/US02/32520

§ 371 (c)(1),
(2), (4) Date: Apr. 7, 2004

(87) PCT Pub. No.: WO03/032129

PCT Pub. Date: Apr. 17, 2003

(65) Prior Publication Data

US 2004/0189944 A1 Sep. 30, 2004

Related U.S. Application Data

(60) Provisional application No. 60/328,685, filed on Oct. 11, 2001.

(51) Int. Cl.
*G01N 21/00* (2006.01)
*G01B 11/24* (2006.01)
(52) U.S. Cl. .................... 356/237.2; 356/601
(58) Field of Classification Search ............. None
See application file for complete search history.

(56) References Cited

U.S. PATENT DOCUMENTS 4,811,253 A 3/1989 Johns (Continued)

FOREIGN PATENT DOCUMENTS

DE 003301494 A1 7/1984

(Continued)

*Primary Examiner*—Layla G. Lauchman
*Assistant Examiner*—Jonathan Skovholt
(74) *Attorney, Agent, or Firm*—Peter J. Manus; Edwards Angell Palmer & Dodge LLP

(57) ABSTRACT

A method and system for visualizing deviations on an actual surface 10, 30 from a nominal, or designed, surface 28 utilizes a system and method for mapping the spatial (e.g. x, y and z) coordinates of the actual surface 10, 30 into a computer 13, comparing the mapped actual surface to the nominal surface 28 to produce a three-dimensional distribution of deviation values (D), processing this distribution into a topographical pattern 34 of multiple contours or areas 34a . . . 34n, each contour or area having the same, or generally the same, deviation value (D), and optically projecting this topographical pattern 34 onto the actual surface 10, 30 in registry with the initial surface mapping to provide a display of the surface deviations (D) directly on the actual surface 10, 30. The deviations are measured along a direction D normal to the actual surface so that the three-dimensional distribution is given in x, y, D coordinates. The optical projection is preferably a laser projection 38. The mapping and projection onto the actual surface 10, 30 are made, and coordinated with one another, with respect to three reference points 32 on the surface 10, 30.

15 Claims, 4 Drawing Sheets

U.S. PATENT DOCUMENTS

| | | |
|---|---|---|
| 5,090,804 A | 2/1992 | Wong et al. |
| 5,196,900 A | 3/1993 | Pettersen .................... 356/141 |
| 5,341,183 A | 8/1994 | Dorsey-Palmateer |
| 5,416,591 A | 5/1995 | Yoshimura et al. ......... 356/376 |
| 5,615,013 A | 3/1997 | Rueb et al. |
| 5,627,771 A * | 5/1997 | Makino ...................... 702/155 |
| 5,646,859 A | 7/1997 | Petta et al. |
| 5,663,795 A | 9/1997 | Rueb |
| 5,671,053 A | 9/1997 | Wigg et al. |
| 5,889,582 A | 3/1999 | Wong et al. |
| 5,957,559 A | 9/1999 | Rueb et al. |
| 6,024,449 A | 2/2000 | Smith ......................... 351/212 |
| 6,036,319 A | 3/2000 | Rueb et al. |
| 6,044,170 A | 3/2000 | Migdal et al. .............. 382/154 |
| 6,066,845 A | 5/2000 | Rueb et al. |
| 6,320,654 B1 * | 11/2001 | Alders et al. ............. 356/237.2 |
| 6,365,221 B1 | 4/2002 | Morton ....................... 427/140 |
| 6,639,660 B1 * | 10/2003 | Beck et al. ............. 356/237.2 |
| 7,193,696 B2 * | 3/2007 | Engelbart et al. ......... 356/237.1 |
| 2004/0247170 A1 * | 12/2004 | Furze et al. ................ 382/141 |

FOREIGN PATENT DOCUMENTS

| | | |
|---|---|---|
| DE | 197 30 885 A1 | 1/1999 |
| EP | 0 997 201 A2 | 5/2000 |

* cited by examiner

METHOD AND SYSTEM FOR VISUALIZING SURFACE ERRORS

CROSS REFERENCE TO RELATED APPLICATIONS

This application is a Section 371 filing of PCT/US02/32520 filed 11 Oct. 2002 which claims priority under 35 USC 119(e) of U.S. provisional application No. 60/328,685 filed 11 Oct. 2001.

BACKGROUND OF THE INVENTION

This invention relates in general to surface verification and correction in the process of manufacturing, and more specifically, to a method and system for producing an optical, topographical display of surface profile errors directly on the surface.

In the process of manufacturing a large part, such as a tool, a mold, or a stamped sheet metal panel where it is important that the surface be precisely shaped, e.g. as in the aerospace industry, it is usually required to verify and, if necessary, to accurately correct (rework) the shape of the surface. Obviously, the surface shape has to be compared with design specifications. In modern production, parts, tools, dies, and molds are usually designed based on computer-assisted design (CAD) models. In computer-aided manufacturing (CAM, for example, computer numerically-controlled (CNC) machine tools use the CAD design as an input to control the operation of the tool in machining a product.

There are a number of methods for precise verification of a surface shape using different profilometers, coordinate measuring machines (CMM's), laser trackers, 3D scanning measurement systems and other equipment.

Some manufacturers such as FARO Technologies, Inc. ("FARO") make manual CMM's that use an articulated arm with six degrees and a contact sensor attached to a free end of the arm. The arm is being moved over the surface by an operator in the manner of a pantograph. Transducers at the articulations supply angular positions which can be converted into surface profile information. Other manufacturers such as Brown and Sharp make automated CMM's based on multi-axis stages and gantries carrying contact or non-contact sensors capable to gather information about a surface profile. Conventional CMM's have limited usage in large scale manufacturing, for example, in aerospace or boat building industries. Most appropriate for large surface profile measurements in those industries are non-contact 3D scanning systems and laser trackers. The precision required for tool surface profiling in aerospace applications is quite high—usually several thousandths of an inch. Non-contact 3D scan measurement system capable of delivering such precision is manufactured by MetricVision. It is suitable for automated surface measurement, but this system is very expensive. Laser trackers generally provide the same high level of precision but they are less expensive and widely used in large scale industrial applications despite substantial manual labor involved in a surface scan.

High precision laser trackers are manufactured by Leica Geosystems AG ("Leica"), Automated Precision, Inc. ("API"), and FARO. Known laser trackers are single point devices. The tracker measures any surface point location by directing a laser beam toward a remote optical probe that touches the surface at a given point. The optical probe made as a ball, usually 0.5-1 inch in diameter, that has a very precise retro-reflective prism inside. The retro-reflective prism is facing away from the surface being measured and it returns the incident laser beam back to its source, which allows tracker's angular servo system to capture the direction of the beam and to follow (track) movement of the ball. Probes of this type are commonly termed a "pick-up ball". When acquiring the surface profile the pick-up ball is being moved by hand from point to point while keeping it in touch with the surface. This process, with periodic recordation of position information, creates so-called "cloud" of digitized surface data points.

Usually trackers or other surface scan measurement systems utilize integrated software capable of comparing measurement data with CAD model data, computing deviations between the actual surface shape and its model, and presenting results in graphic form on a computer screen or a plotter. It helps to analyze surface imperfections and to decide if the tested part is within specifications or not. Some of parts and, especially, large tools in aerospace industry are so expensive in production that it is often more reasonable to manually rework and correct their surface flaws rather to completely remake them. However, for the surface rework process it is not enough to see detected imperfections on a computer screen but it is absolutely necessary to map and locate those imperfections directly on the tested surface.

In today's industrial practice this mapping of the imperfections on the tested surface is done manually, literally with a ruler and a pencil, by drawing auxiliary lines on the surface and marking surface errors point-by-point. It is a very difficult and time-consuming process. For large precise parts it can take weeks of time to complete. And every time when a particular area on the surface is corrected by filling or grinding, all marks are being erased. So, if after second verification it is necessary to "touch up" or additionally correct that area, the manual mapping and marking has to be done again. Manual error mapping also includes a quite difficult procedure to reference the region of rework with respect to datum features of a part. That sometimes requires one to map out and mark an auxiliary mesh grid lined onto the surface.

U.S. Pat. No. 6,365,221 to Morton describes a computer controlled method for fairing and painting marine vessel surfaces. Morton uses multiple robots positioned on moveable transports. Arms have various attachments such as laser surface mapping systems, compound and paint sprayers, and milling and vacuum apparatus. No projection of information about surface variations onto the vessel is described, nor is there any disclosure of a comparison of the actual surface to a design surface. This system is limited to applications, such as marine vessel manufacturing and refurbishing, where a relatively coarse level of precision with respect to the surface, e.g. about ⅛ of an inch, is acceptable. This is an expensive system that is economically reasonable only for processing huge surfaces. In contrast, aerospace manufacturing processes, e.g., typically require 10 times better precision.

Thus there is a need to improve, accelerate, and reduce cost of the existing processes of manual surface correction in aerospace and other industries that demand a high degree of precision.

It is therefore a principal object of this invention to provide a method and system for visualizing errors of a surface shape by optically projecting onto the actual surface a topographical map of deviations of that surface from a nominal, design surface.

Another object of the invention is to continuously display on a surface a mapping in patterns (contours or areas) of the same or generally the same deviation over all, or significant portions of, the surface.

Another object of the invention is to reduce the time required to rework a surface, particularly a large surface such as on a mold, die, tool, or formed panel of a product such as an airplane fuselage.

Still another object is to provide such an on-surface projection without requiring an auxiliary mesh grid to be mapped onto the surface.

A further object is to provide a system that is comparatively compact, mobile, and readily removed from and repositioned with respect to the surface being tested and/or reworked.

SUMMARY OF THE INVENTION

The method and system of the present invention provides a precision visualization of surface shape errors by optically projecting directly onto the actual surface a pattern outlining the areas that deviate from a design, or nominal, surface. The pattern projected can be an area or areas of the same color of projected light representing the same degree of surface area, or, in the presently preferred form, the pattern can be a contour line or lines that each connect spatial points of the actual surface that have the same, or generally the same, value for the surface error. The actual surface can be mapped, in its presently preferred form, by a tracking-type data acquisition system that scans the surface, e.g. by movement over the surface of an element carrying a member that retro-reflects laser light. A laser tracker follows the retro-reflective member, periodically acquiring its spatial coordinates from the positions of the retro-reflective element in the direction of the laser beam. This tracking produces a three-dimensional "cloud" of digitized data points that give a spatial profile of the actual surface, typically in standard three-dimensional coordinates, X, Y, and Z, and typically not evenly spaced. Because the retro-reflective element can be "painted" over the surface manually, the locations of the acquired measurement points are "arbitrary", as opposed to being spaced at regular, grid-like intervals.

This data point cloud is processed for comparison with the nominal surface. In the presently preferred form, this processing establishes a mesh grid—a two-dimensional array [X(i), Y(i)]. The grid mesh, set by the number of lines, "i", is sufficiently dense enough to be used in representation of the nominal and actual (measured) surfaces. Typically, one can use CAD model data to derive a data set representing the nominal surface sampled (digitized) at the nodes (points of X and Y grid line intersection) of the mesh grid. This data set is stored as a three-dimensional array [X(i), Y(i), $Z^{nom}$(i)].

The actual surface is measured at some arbitrary points (dense enough to represent that surface), for example, by a tracker, resulting a point cloud [X(k), Y(k), $Z^{actual}$(k)]. Here "k" denotes points on the measured surface.

The measured point cloud data taken at arbitrary points on the surface are converted, using interpolation, to generate a data set of "knot points" that represents the actual surface by points that computed for the nodes of the mesh grid. This data set is to be stored as a three-dimensional array [X(i), Y(i), $Z^{act-int}$(i)]. It is used to represent the actual surface for the subsequent computations.

Based on the CAD model data for the nominal surface, the method of the present invention then computes a deviation D(i) for each knot of the actual (measured) surface in a direction normal to the actual surface at that knot point. The resulting set of deviations D(i) in a three-dimensional array (X(i,) Y(i), D(i)) are then stored in memory for mapping into a three-dimensional space (X,Y,D).

To transform this deviation space into a two-dimensional topographical map, the invention then sets up a number of incremental levels in the dimension D separated by a chosen deviation tolerance Δ(D). The separations between levels are not necessarily uniform. Each level can also be viewed as a "planar slice" through the three-dimensional digitized representation of the surface errors mapped into the "D" space.

In the presently preferred arrangement where the topographical pattern is a set of contour lines, each contour line is a boundary in the X-Y domain of the "D" space grouping all points where deviations are equal to a particular D level. Each contour array ($X^{cont}$(j), $Y^{cont}$(j), $D_m$) is computed by numerical solving of a non-linear equation and it represents a group of points where deviations are equal $D_m$. Contour arrays represent close or open-ended contour lines. Also, each contour array is arranged in such a way that subsequent array elements correspond to the neighboring points in the contour line.

Each contour array is then converted into a projection array by substituting $D_m$ with $Z^{act-int}$(j). Every resulting projection array ($X^{cont}$(j), $Y^{cont}$(j), $Z^{act-int}$(j)) represents a series of points that belongs to the interpolated actual surface outlining the contour of a particular tolerance level deviation.

Finally, the set of projection arrays is to be used as the input data for an optical projector, preferably a laser projector, to visualize the set of contour lines showing directly on the actual surface the areas deviating from the design.

DETAILED DESCRIPTION OF THE INVENTION

Figure 1:
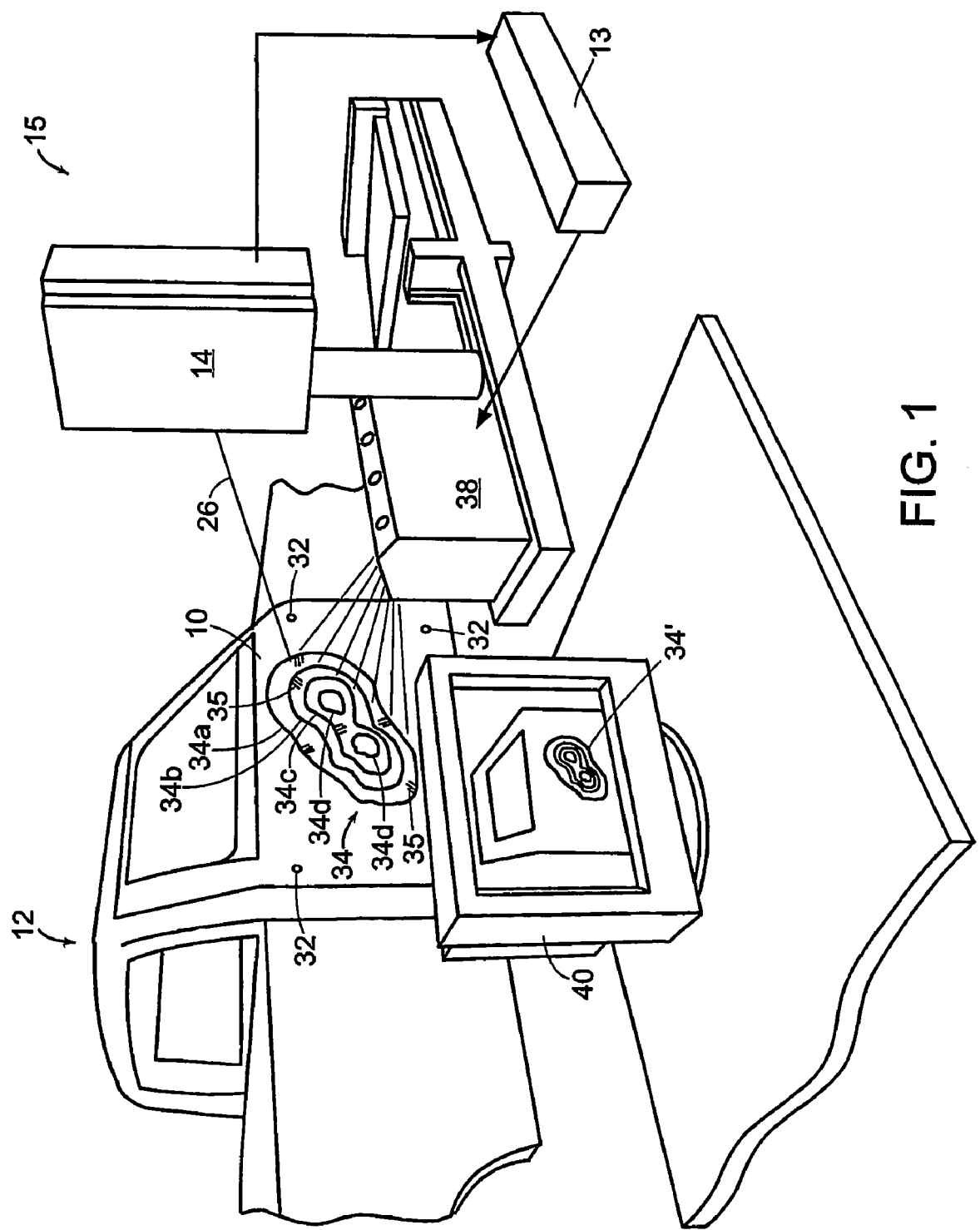
FIG. 1 is a view in perspective of an error visualization system operated in accordance with the present invention.
Figure 2:
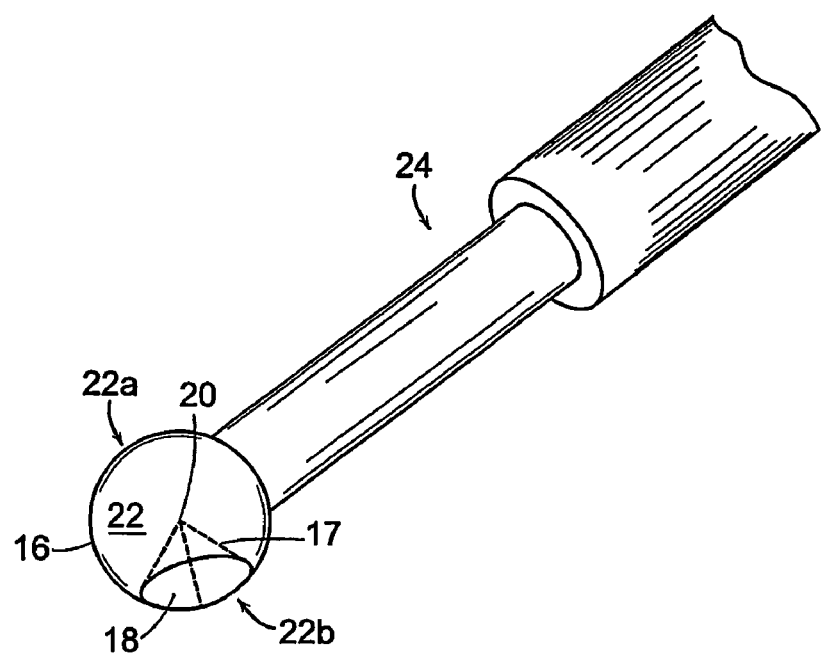
FIG. 2 is a view in perspective of a hand-held profiling device used in the acquisition of actual surface data points.

With reference to FIGS. 1 and 2, the present invention is a system 15 and method for visualizing errors on a surface 10 shown in FIG. 1 by way of an example as an exterior panel of a door of a pickup truck 12. The major components of the visualization system 15 are a laser tracker 14 that measures actual shape of the surface 10, a processor 13, and an optical projector 38 that displays a visual topographical error pattern 34 on the surface 10.

Laser tracker 14 provides surface profile measurements. It is being operated in conjunction with a retro-reflective element 16 (FIG. 2) that can be moved freely over the surface 10. The retro-reflective element 16 has a high precision corner cube prism 17 mounted inside a hardened steel ball 22. A front face 18 of the corner cube prism 17 opens outwardly through the circular cut 22b in the ball 22. A vertex 20 of the prism 17 is precisely aligned with the geometric center of the ball 22. A hand-held wand 24 carries the ball at one end, e.g. replaceably secured by a magnet mounted in one end of the wand. The back surface of the ball 22a opposite the cut 22b is in maintained contact with the surface 10 as the wand 24 with retro-reflective element 16 is moved manually by operator over the surface. A source laser beam 26 directed from the tracker 14 strikes the retro-reflective element 16 which directs the beam back to the point of its origin. The tracker includes photosensitive elements that receive this reflected light beam and detect movement of the retro-reflective element 16. The detected movement produces a corresponding control signal that allows tracker's angular servo system to capture the reflected beam direction and to steer the source laser beam 26 to follow, or "track", the retro-reflective element 16 as operator moves it over the surface 10. The tracker 14 acquires position of the retro-reflective element 16 by measuring the azimuth and elevation angles of the source laser beam 26 steering mechanism while tracking and by determining the distance between the tracker 14 and the element 16. It samples position of the element 16 periodically, e.g. every ¼ second, so that as operator "paints" the surface 10 constantly moving the wand 24 with retro-reflective element 16, a large number of positional data points are generated. Azimuth and elevation angles, and distance are internally translated into X, Y, Z coordinates for any given location of the element 16 on the surface 10.

Collected positional data points are scattered non-uniformly over the tested surface 10. This method of digitizing surface shape is known as obtaining so-called "point cloud". Coordinates of those initially acquired data points are referenced with respect to the initial tracker coordinate system X, Y, Z.

As shown in FIG. 1, there are at least 3 reference points 32 associated with the surface 10. Positions of points 32 are known precisely with respect to the coordinate system of the truck's 12 design model. Some convenient structure features like holes or rivets are usually used as those reference points. Operator sequentially locates retro-reflective element 16 at reference points 32 causing tracker 14 to acquire their positions. The acquired reference points data are needed to transform the "cloud" of surface 10 data points from the initial coordinate system X, Y, Z into the design model coordinate system. That is usually being done by the tracker internal software. Suitable laser trackers are commercially available from the aforementioned Leica, FARO or API. The data thus acquired by the tracker 14 are sent to the processor 13 that generates command information for the projector 38. The data processed in the manner which will be described in more detail below, with the end result being the projection of a visualization pattern 34 as a topographical display of the surface 10 errors. The processor 13 can by physically located, e.g. on a p.c. board, in the tracker 14, the projector 38, or as a separate component. It is shown in FIG. 1 schematically as a functional block communicating with the tracker 14 and the projector 38.

As will be understood, the surface 10, while shown as the door panel of a truck, can be any of a wide variety of surfaces such as those of a mold, die, machine tool, or any of a wide variety of finished products, and in particular the outer surface of airplanes and missiles. Similarly, while a laser tracker 14 is described and illustrated, the invention is not limited to any particular type of surface measurement, apparatus or technique. Mechanical coordinate measuring machines or non-contact 3D scan measurement systems are known and could be used for the laser optical tracker 14. Still further, while a hand-held wand 24 is illustrated and described as operating in conjunction with the tracker 14 to acquire the actual surface profile, it will be understood that this is merely one illustrative example of an apparatus for a contact surface scanning of a surface being inspected and/or reworked, and that any of the other arrangements known to those skilled in the art, including non-contact surface profile acquisition systems, can be used.

The projector 38, preferably a laser projector, receives its input information from the processor 13 to control the movement of its laser beam to display the surface 10 errors directly onto the surface 10 in the form of the pattern 34. Laser projector 38 employs a pair of mirrors attached to precise galvanometers to steer the laser beam very fast and to direct it at each given moment of time exactly toward the given point (x, y, z) on the surface 10. The beam trajectory is being generated from a sequence of input data points (x, y, z) supplied by the processor 13. Those projector input data points are organized in groups (arrays) traditionally named "layers". Each "layer" represents an isolated single component (for example, line or contour) of the pattern 34. The laser beam hits the surface 10 with a focused spot that moves across the surface repeating its trajectory with all components of the pattern 34 again and again in the manner of a movie or laser show. For a practical industrial arrangement of the system 15 having the distance between the projector 38 and the surface 10 to be about 15 feet the laser beam spot moves across the surface 10 with velocity in excess of 700 miles per hour. That provides projection of the pattern 34 containing up to 20 isolated components—"layers" without visible flicker.

The laser projector 38 also has a photosensitive element that receives light reflected back from some features on the surface 10, in particular, retro-reflective targets attached to the reference points 32. As it was mentioned above, positions of the points 32 are known precisely with respect to the coordinate system of the truck's 12 design model. Prior to actual projection, the projector 38 scans points 32 with its laser beam and computes its location in 3D space with respect to the design model's coordinate system. That enables projector 38 to utilize the stream of input data points (x, y, z) for projection referenced directly to the design model coordinate system.

A suitable laser projector is commercially available from Laser Projection Technologies of Londonderry, New Hampshire and sold under the trade designation "LPT". It should be understood that the usage of such a laser projector is described here as just one of possible examples of a digitally controlled optical projection apparatus capable of displaying a specified pattern on a curvilinear surface. The LPT brand projector has a ranging capability that lends itself to adaption of the projector 38 to also perform a tracking or surface profile acquisition function, e.g. with sensing of mirror positions as surface point position data inputs. The invention therefore contemplates the tracker 14 and projector 38 being one piece of equipment that can also include the computer 13, e.g. as a processor chip mounted on a p.c. board separately connected to, or within, the tracker-projector.

Figure 3:
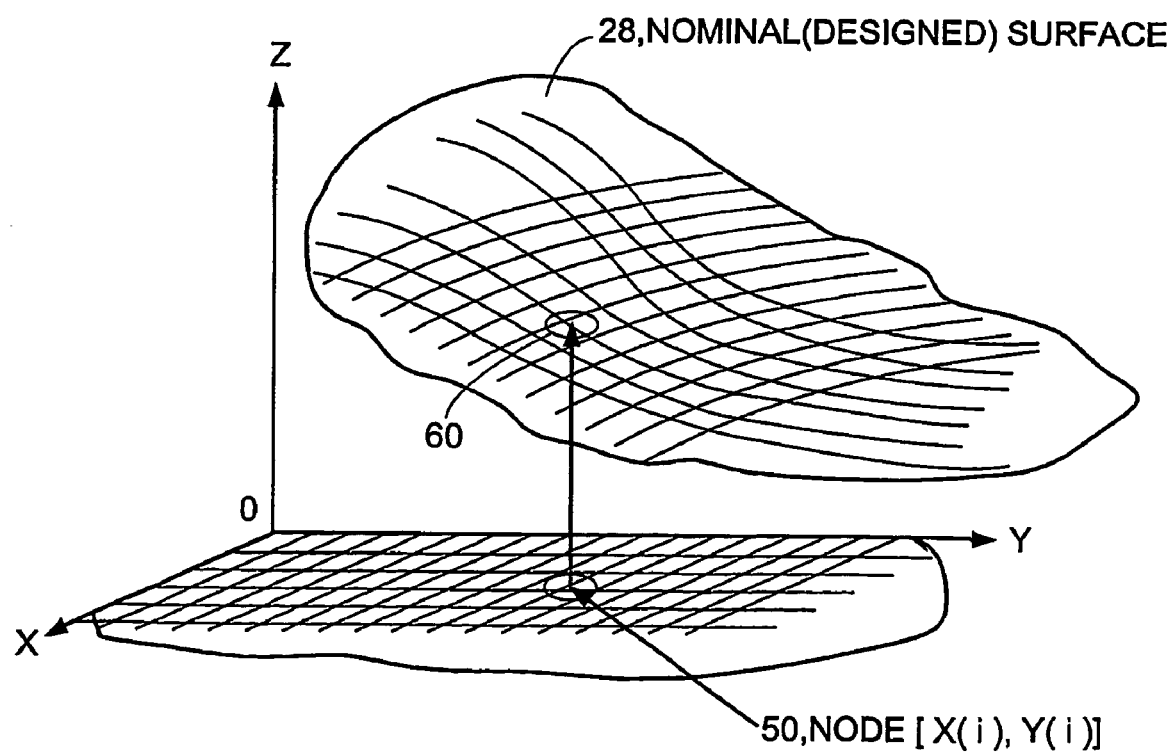
FIG. 3 is a view in perspective of nominal (designed) surface represented as a set of patches showing a knot and its corresponding node point in a two-dimensional X, Y mesh grid.
Figure 4:
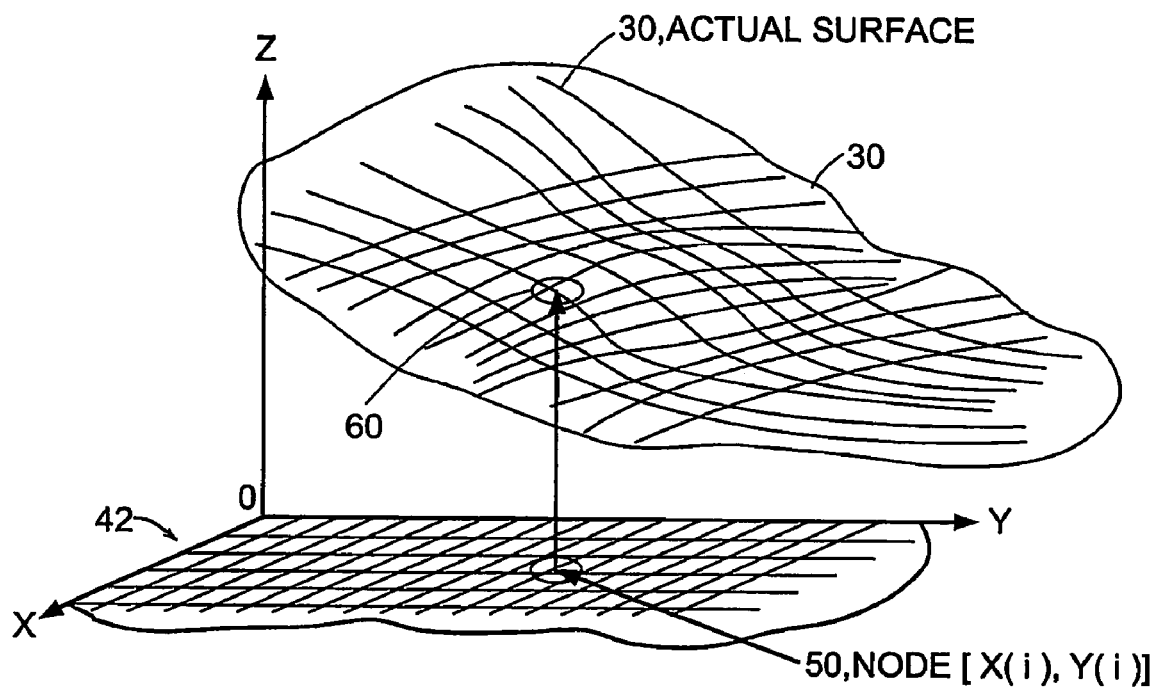
FIG. 4 is a view (similar to FIG. 3) of computed representation of the actual surface in three-dimensional X, Y, Z space shown as a set of patches with a knot corresponding to the same node as shown in FIG. 3.

For the purpose of further description we assume here that the tested surface 10, represented as actual surface 30 in FIG. 4, differs from its design model represented as nominal surface 28 in FIG. 3. Processor 13 computes surface errors in a form of so-called "reversed normal deviations" (see below) between the actual surface 30 and the nominal surface 28. Projected pattern 34 is a visualization of those deviations in the form of a topographical display. In particular, the visualization shows areas where the surface errors exceed the tolerance limits of the design for that surface and require a reworking such as a grinding down of high points or filling in of depressions.

While the topographical display can take a variety of forms, it is shown in the presently preferred form in FIG. 1 as a pattern of contours 34a-34d, each indicating a boundary line of generally equal deviations from the nominal surface. This contour projection approach provides a direct, on-site visualization of what are often very small, difficult to see variations of the surface from the intended design. Every projected contour line on the surface 10 goes exactly through a set of points where deviation are equal to a particular tolerance value. The contours 34 not only show the location of the errors, the topographical nature of the contours also locates and identifies directly the degree of the deviation. Each projected contour also includes one or more so-called "directional pointers" 35 (FIG. 1) that touch the contour at its side associated with the positive deviation gradient. The gradient pointers 35 are like those used on topographical maps. The projected array of contours greatly facilitates a reworking of the surface to nominal specifications. The visualization pattern 34 does not require any "grid in" process such as a physical drawing of gridlines on the surface 10 in order to correlate the information from a tracker or the like with a physical location on the surface to be reworked.

While the invention is described herein with respect to projection of contour lines having the same color and defining a region having substantially the same value for the deviation from the nominal surface, the invention also includes (1) defining different levels of deviation in different colors or with different patterns (e.g. dashed lines, dotted lines, solid lines, etc.) and (2) the display of areas of deviation that meet or exceed a given tolerance level as solid lighted areas, as opposed to boundary or contour lines. Such areas can additionally be color-coded so that any one color represents one level of deviation from the nominal surface. As shown in FIG. 1, the system also preferably includes a monitor 40 connected to the processor 13 which allows an operator of the system to observe a display 34' of the pattern 34 independent of its projection onto the surface 10.

The tracker, projector, monitor and surface 10 can be moved with respect to one another after the operation of the tracker to obtain a profile of the actual surface, and then readily repositioned at a later time in connection with a reworking or an inspection of the surface 10. The components are comparatively compact, and no precise re-positioning is required.

The method for visualizing surface errors employed by the visualization system 15 utilizes the surface design (CAD) model data as an input and includes the following steps.

1) Pre-Process the CAD Model Surface Data and Establish a Mesh Grid.

In today's 3D design practice there are a number of possible representations of a surface in a CAD model. They include implicit or parametric forms of equations, composite surfaces represented by patches, surfaces represented by NURBs (Non-Uniform Rational B-Splines), etc. There are a large number of books and publications in computer aided geometric design that generally teach in three dimensional surface geometry, representations, interpolation, fitting and approximation. Examples include: I. D. Faux and M. J. Pratt "Computational Geometry for Design and Manufacture", John Wiley & Sons, 1983; H. Toria and H. Chiyokura (Eds.) "3D CAD Principles and Applications", Springler-Verlag, 1991; H. Spath "Two Dimensional Spline Interpolation Algorithms", A. K. Peters, 1995.

Typical tool and part surfaces that may require rework in aerospace and other industries are usually fairly smooth by design. It is always practically feasible to outline a part of a surface for verification and rework that does not have sharply bent areas, e.g. where a normal vector to any given surface point has a direction that differs from the direction of any other normal vector to this surface by not more than 90 degrees. Further here, we consider an example of such a design surface represented by a set of plane patches that built upon a uniformly spaced X-Y mesh grid that is constructed as a two-dimensional array of grid lines [X(i), Y(i)]. This surface representation is shown as nominal surface 28 in FIG. 3. The surface 28 is sampled precisely at the node points 50 (intersections of the X and Y grid lines) of the mesh grid 42. The surface 28 consists of quadrilateral plane patches with vertices (knots) 60. The mesh grid 42 spacing should be sufficiently dense to make sure the design surface is represented by the set of plane patches with the requisite degree of accuracy and precision. Z(i) data points associated with each of the grid node points (Xi, Yi), define the nominal surface 28 at knots 60. This data is stored as a three-dimensional array [X(i), Y(i), $Z^{NOM}(i)$] and it is used as a substitute for the nominal surface 28 in subsequent computations herein.

The nominal surface 28 shown in FIG. 3 as an illustrative example has its average normal vector pointing somewhat up, there is an acute angle between the average normal and the Z axis. That defines the coordinate plane for the mesh grid 42 chosen to be X-Y. In other imaginable situations other coordinate planes could be selected. Then the mesh grid would be constructed as (Xi, Zi) or (Yi, Zi). That is why a preprocessing of the CAD model surface data may be needed before establishing a mesh grid and constructing the nominal surface data array for subsequent computations herein. Calculations involved in the preprocessing may include transformation of design model data from initial representation into a set of plane patches, computing an average normal vector to the designed surface, and selecting a coordinate plane to construct the mesh grid in such a way that the coordinate axis normal to the selected coordinate plane will have an acute angle between it and the average normal vector to the designed surface. These calculations use conventional computational geometry. Next, there is an example of the X-Y coordinate plane selected to construct the mesh grid 42 with the node points 50 (Xi, Yi) and the nominal surface data array [X(i), Y(i), $Z^{NOM}(i)$].

2) Acquire the Actual Surface Data Points.

This step has been described above with reference to FIGS. 1 and 2. By some coordinate measuring means, the actual surface is measured at a number of arbitrary points. The points are dense enough to provide sufficiently accurate and precise representation of the actual surface for the given application. For example, using the optical laser tracker 14 described hereinabove results in a point cloud [X(k), Y(k), Z(k)] acquired for the surface 10. The point cloud data are referenced to the design model coordinate system.

3) Transform to an Actual Surface Representation.

Because the actual surface data are acquired generally at arbitrary scattered points, it is necessary to transform them into an appropriate surface representation that can be eventually used to calculate surface deviations suitable for further computation of topographical contours. FIG. 4 illustrates the appropriate representation of the actual surface 30 as a set of plane patches that built upon the mesh grid 42 that was constructed using design model data for the nominal surface 28.

To transform the acquired surface data point cloud into the representation shown in FIG. 4 one skilled in the art can use known, so-called local methods of scattered data interpolation (see, for example, L. L. Shumaker "Fitting Surfaces to Scattered Data" in "G. G. Lorentz and L. L. Shumaker (Eds) "Approximation Theory II", Academic Press, 1976, or P. Lancaster and K. Salkauskas "Curve and Surface Fitting", Academic Press, London, 1986), and then compute interpolated surface points for the nodes 50 of the mesh grid 42. Tis computation will result in a data set stored as a three-dimensional array [X(i), Y(i), $Z^{act-int}(i)$], where X(i) and Y(i) define node points 50 in the two-dimensional mesh grid 42 identical to those in the representation of the nominal surface 28. The $Z^{act-int}$ values are interpolations ("int") in between the arbitrary acquired points in the scanned point cloud of the actual surface.

4) Deviation (D) Computation.

Figure 5:
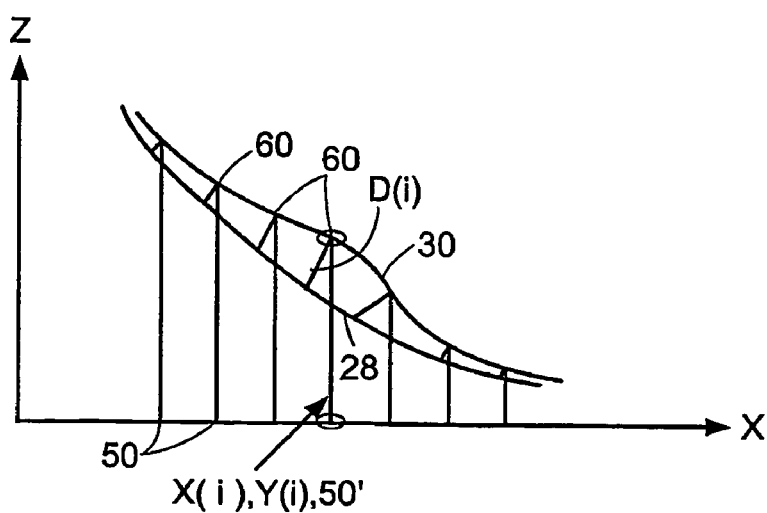
FIG. 5 is a graph of a two-dimensional (X, Z) cross section of the actual and nominal surfaces showing node points X(i) and corresponding knot points on the nominal and actual surfaces and further showing surface deviations D at each knot point directed at normal to the actual surface toward the nominal surface.

With reference to FIG. 5, for each knot 60 on the actual surface representation 30, as digitized and forming part of the data set described hereinabove in step 3, the method of the present invention computes a deviation D(i) for each of the knots 60 on the actual surface 30. For each given knot point (X(i), Y(i), $Z^{act-int}(i)$) the value of the deviation D(i) is computed as so-called reversed normal deviation. A reversed normal deviation means the distance from a given knot 60 of the actual surface 30 along a direction that is normal to the actual surface 30 at the knot point 60 and directed toward the nominal surface 28. To calculate a reversed normal deviation at a given knot point it is necessary, first, to find the average normal vector at this knot. Because the surface 30 representation is defined, in the present example, as a set of plane patches, it is possible to calculate the average normal vector by averaging over the four normal vectors constructed to the four plane patches surrounding the given knot. Second, the reversed normal deviation at the given knot is computed as a distance from the given knot along a line in the direction of the average normal vector at this knot to a point where the line intersects with the nearest plane patch representing the nominal surface 28. A positive value of D(i) represents deviation directed toward one side of the nominal surface (e.g. concave), and a negative deviation value of D(i) represents deviation directed toward the opposite side of the nominal surface (e.g. convex).

It is significant to emphasize here that these deviation values D(i) in X, Y, D space are not the same as Z(i) values in conventional three-dimensional X, Y, Z space. For example, if the surface is hemispherical, an outward bulging deviation D on that hemispherical surface at a "pole" position in the middle of the hemisphere will have the same value as its displacement along the Z axis (D=Z). However, the same bulge with the same deviation D located at or near the "equator", or edge of the hemisphere will have a negligible Z value (D>>Z). By using D calculated along a normal to the actual surface at a knot, the present invention obtains a more accurate representation of the true error. Further, in reworking a deviation, the D value is more informative, and will lead to a more accurate reworking, than a Z value.

While the deviation D has been described as measured from a knot in the actual surface 10 along a line normal to that surface, it is possible to measure the deviation from a knot 60 on the nominal surface 28, along a line normal to the surface at that knot. These and other choices in the detailed implementation of the invention can be made to reflect a balance between factors such as the precision of the measurement and the simplicity of the calculations. Here, measurements of D from knots on the actual surface yield a more precise measurement of the deviations, but one that involves more complex calculations than when D is measured along lines normal to the nominal surface.

5) Store Deviations.

The calculated data set of deviations D(i) resulting from the foregoing computation is merged with the mesh grid data set (Xi, Yi) into a three-dimensional array X(i), Y(i), D(i) that is stored in memory for further processing to eventually generate the topographical pattern 34.

6) Map Deviation Space and Set Up Deviation Tolerance Levels.

Figure 6:
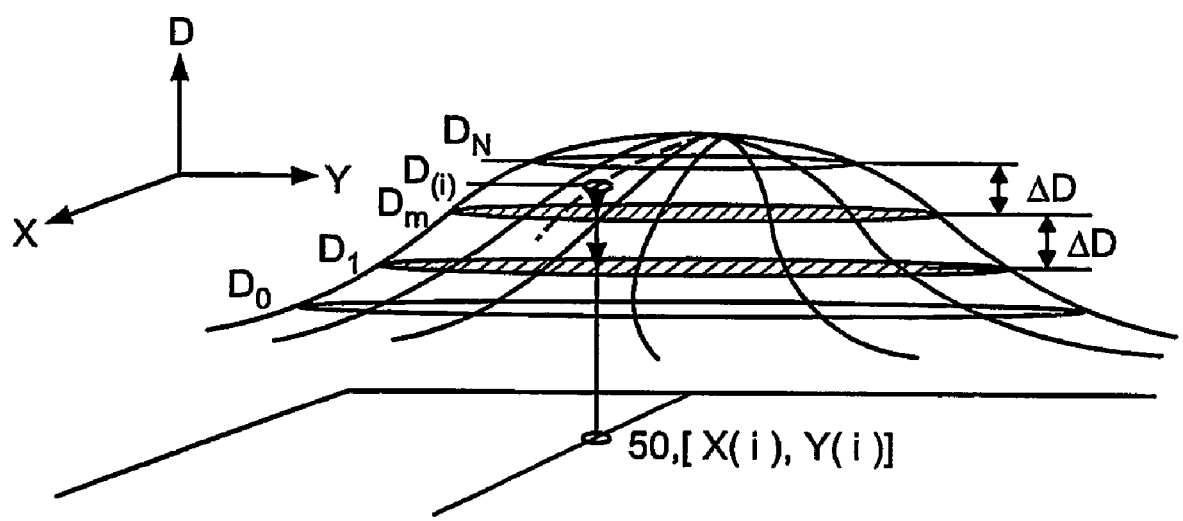
FIG. 6 is a graphical representation in a deviation space (X, Y, D) of a three-dimensional distribution of deviations of the actual surface from the nominal surface, and corresponding X, Y mesh grid, and also showing planar tolerance intervals $D_0, \ldots, D_N$ in deviation space taken normal to the D axis.

The values X(i), Y(i), D(i) stored in the step 5 are to be mapped into a three-dimensional space (X,Y,D) with D representing the magnitude of the deviation at any corresponding X,Y node point, as shown in FIG. 6. To transform this deviation space eventually into a data set suitable as an input for the projector 38, a series of incremental levels, in planes orthogonal to the D axis, are set up at $D_0$, $D_1$, $D_m$, ... $D_N$. Each D level is separated by a chosen deviation tolerance $\Delta$ (D), which is not necessarily uniform from level to level. Each level can be thought of as a "planar slice" through the three-dimensional digitized representation of the surface errors mapped into the "D" space.

7) Form a Set of Contour Lines.

The next step is to compute a set of contour lines as boundaries in the X-Y domain of the "D" space grouping all points where deviations are equal to a particular D level $D_0$, $D_1$, $D_m$, ... $D_N$. There is a well known mathematical method to perform such computations. Deviation D is assign to be a function of two variables X and Y. Then the required contour lines can be found as solution sets of N non-linear equations expressed in implicit general form as: D(X, Y)=$D_m$. Because we use digital representation of the surface errors those equations become numerical expressions D(i) (X(i), Y(i))=$D_m$ defined over the mesh grid 42 domain. D(i), X(i), and Y(i) here are the components of the a three-dimensional array stored in step 5 above. Solving methods and algorithms for this kind of equations are known, for example, as described by Gene H. Hostetter et al. in "Analytical, Numerical, and Computational Methods for Science and Engineering", Prentice Hall, 1991, the disclosure of which is incorporated herein by reference. This book teaches how to do search and track of isolated contour lines, how to separate them, how to do a two-dimensional gradient computation, and how to generate topographical contour maps.

Numerical solving of the above mentioned equations results in generating of N sets of contour arrays. Each set includes one or more contour arrays that correspond to a particular tolerance incremental level. Each contour array ($X^{cont}(j)$, $Y^{cont}(j)$, $D_m$) represents a group of points where deviations are equal $D_m$. Contour arrays can represent close or open-ended contour lines. Also, each contour array is arranged in such a way that subsequent array elements correspond to the neighboring points within the contour line. Additionally, the direction of a positive deviation gradient, line to adjacent line, can-be calculated to construct special small open-ended pointer arrays that can be used later to project gradient pointers 35.

8) Form a Topograghical Map of the Deviations.

Each contour array is converted into a projection array by substituting $D_m$ with $Z^{actual-int}(j)$ found in foregoing step 3. Each resulting projection array $(X^{cont}(j), Y^{cont}(j), Z^{act-int}(j))$ represents a series of points that belongs to the interpolated actual surface outlining a contour of particular tolerance level deviation. The whole plurality of sets of contour arrays generated in step 7 is to be converted into projection arrays representing the whole topographical pattern 34. Additionally, there could be a number of special projection arrays converted from the special small open-ended pointer arrays mentioned above with purpose of projecting one or more gradient pointers 35.

9) Project the Error Pattern.

Data points as converted in step 8 representing the topographical error pattern 34 are used as input data for the optical projector 38, preferably, but not necessarily, a laser projector, to project the pattern 34 onto the surface 10. This visualizes the set of contour lines directly on the actual surface, thereby illustrating immediately on the surface those areas deviating from the designed surface as well as giving a direct visual indication of the degree of the deviation in a given area.

While the invention has been described with reference to preferred embodiments, various alterations and modifications will occur to those skilled in the art and those modifications and variations are intended to fall within the scope of the appended claims.

What is claimed is:

1. A method for visualizing deviations on an actual surface from a nominal surface comprising the steps of:
   a. mapping the spatial coordinates of an actual surface,
   b. comparing said mapped spatial coordinates to the nominal surface to produce a three-dimensional distribution of values for deviations D of the actual surface from the nominal surface,
   c. generating from said distributions a topographical pattern of deviations having generally the same deviation value D, and
   d. optically laser projecting that topographical pattern onto the actual surface to visualize said deviations D, where said optical laser projecting is made with reference to at least three fixed reference points on said actual surface.

2. The method of claim 1 wherein said deviations D are measured along a normal to the actual surface.

3. The method of claim 1 wherein said topographical pattern constitutes plural contours each including deviation values falling within a range of a different selected values of D.

4. The method of claim 1 wherein said mapping is made with reference to at least three fixed reference point on said actual surface.

5. The method of claim 1 wherein said generating comprises processing said distribution of sampled spatial coordinate data into a surface of points representative of the actual surface.

6. The method of claim 1 wherein said mapping comprises optical tracking.

7. The method of claim 2, 3, or 5 wherein said processor establishes a mesh grid of a preselected grid spacing and conforms said spatial coordinate data and said nominal data to said mesh grid.

8. The method of claim 3 wherein said generating also produces a gradient value and direction of increasing gradient between said contours, and said optically projecting includes a projection of a graphical representation of said gradient associated with said contours.

9. Apparatus for visualizing deviations in an actual surface from a nominal surface comprising:
   a. a surface profiler that maps the spatial coordinates of an actual surface,
   b. a processor that
      i) compares said mapped spatial coordinates to the nominal surface to produce a three-dimensional distribution of values for deviations D of the actual surface from the nominal surface, and
      ii) generates from said distributions a topographical pattern of deviation having generally the same deviation value D, and
   c. an optical laser projector that projects a topographical pattern onto the actual surface to visualize said deviations D.

10. The apparatus of claim 9 wherein said processor computes said deviation D along a normal to the actual surface.

11. The apparatus of claim 10 wherein said topographical pattern constitutes plural contours each including deviation values falling within a range of a different selected values of D.

12. The apparatus of any of claims 9-11 wherein said actual surface has at least three reference points and said profiler and said optical projector operate with reference to said at least three fixed reference points.

13. The apparatus of claim 12 wherein said processor also generates a gradient associated with said contours and said optical projector projects a visual display of said gradients.

14. The apparatus of claim 12 wherein said surface profiler is an optical tracker.

15. The apparatus of claim 12 wherein said processor establishes a mesh grid of preselected grid spacing and conforms said spatial coordinates and said actual normal surface to said grid.

* * * * *